Dec. 26, 1950 J. L. ROONEY 2,535,321
ADJUSTABLE EYEGLASSES
Filed Sept. 22, 1948
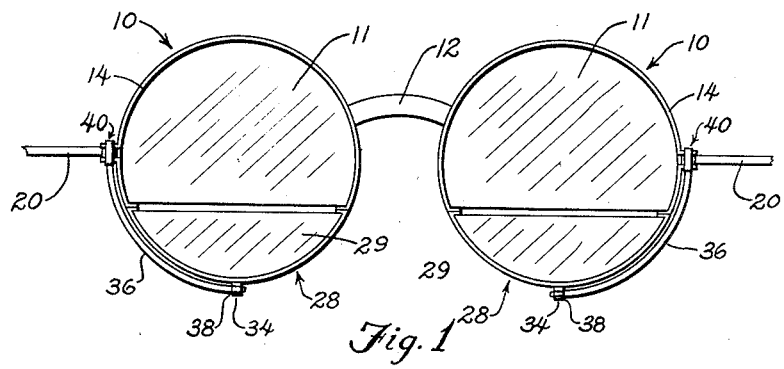
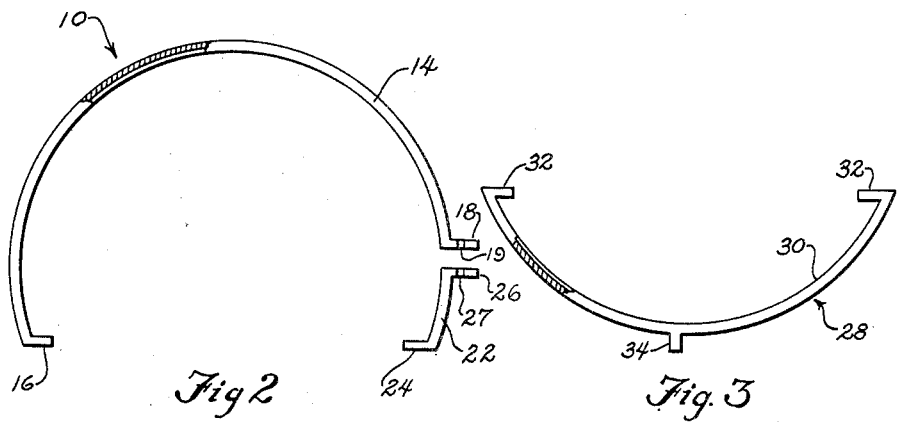
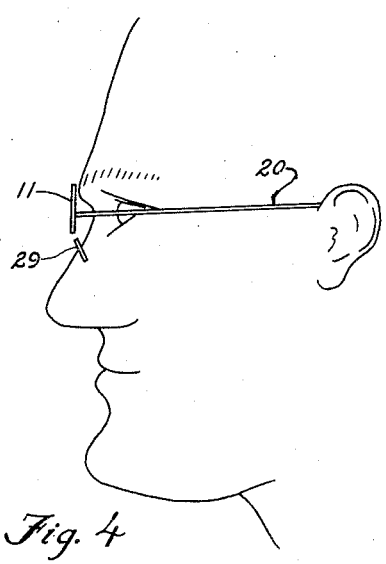
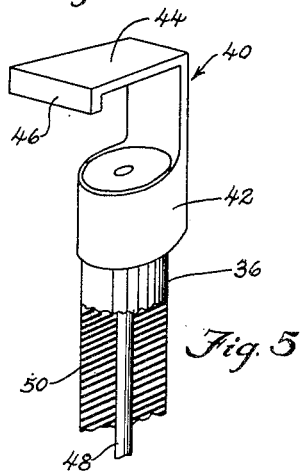
INVENTOR.
John L. Rooney, Patented Dec. 26, 1950

2,535,321

UNITED STATES PATENT OFFICE 2,535,321

ADJUSTABLE EYEGLASSES

John L. Rooney, Chicago, Ill.

Application September 22, 1948, Serial No. 50,573

2 Claims. (Cl. 88—41)

This invention relates to improvements in eyeglasses or spectacles and is concerned more particularly with devices having a plurality of lenses which may be selectively adjusted and employed for purposes of either normal or close vision. The present application is a continuation-in-part of my prior application Serial No. 779,609, filed October 23, 1947.

It is an object of the invention to provide a device having complementary upper and lower frame sections adapted to receive different lenses suited for far or near vision of the user so that a single pair of eyeglasses may be available for both purposes.

A further object of the invention is to provide upper and lower frame sections which are relatively adjustable in such a manner that the appropriate lens sections carried thereby may be disposed perpendicularly to the lines of normal or horizontal vision and close or downward vision. The invention also contemplates that the lens sections, in addition to being relatively adjustable on horizontal axes, be further relatively adjustable on vertical axes such as to be adapted for use by cross-eyed persons.

Another object is to provide eyeglasses having novel upper and lower frames sections which present no obstruction to the user's vision through the lenses supported thereby and which may be readily sprung apart to facilitate lens replacement.

Still another object is to provide a novel form of connecting arm for securing together the complementary upper and lower frames and lenses which arm may be readily adjusted to maintain the lenses in any desired relative position and which may be easily detached to facilitate lens replacement or to permit use of the upper lenses only if desired.

Other and further objects and advantages will be apparent from the following detailed explanation taken in conjunction with the accompanying drawings wherein a preferred embodiment of the principles of the present invention has been selected for exemplification.

In the drawings:

Fig. 1 is a front elevational view of a pair of eyeglasses constructed in accordance with the present invention;

Fig. 2 is an enlarged front elevational view partly in section of one of the upper frame sections shown in Fig. 1;

Fig. 3 is an enlarged front elevational view partly in section of one of the lower frame sections shown in Fig. 1;

Fig. 4 is a side view of the eyeglasses of Fig. 1 shown as applied to a user but having the frame connecting arm removed better diagrammatically to illustrate the lens adjustment feature; and Fig. 5 is an enlarged perspective view partly broken away of a fragment of the frame connecting arm showing the clip attaching portion thereof.

Referring more particularly to the drawings, wherein like numerals refer to like parts, the eyeglasses shown in Fig. 1 are composed of a pair of upper frame sections indicated in their entireties at 10 and connected by a nose piece 12. Each of the frames 10 preferably is formed of an elongated arcuate member 14 having its body portion channelled as shown in section in Fig. 2 to receive a lens and having an inturned lip 16 at one end to retain the lens and an outturned lip 18 at its other end apertured at 19 to secure the usual post for pivotally supporting a temple member 20. The frames 10, as shown, also include a complementary short arcuate member 22 similarly channelled to receive the lens and similarly having an inturned lens retaining lip 24 and an outturned lip 26 apertured at 27 to receive the temple post.

The lower frames indicated in their entireties at 28 are formed preferably each of a single arcuate member 30 channelled as shown in Fig. 3 to receive the lower lens and having integral inturned lens retaining lips 32. The lower frame members 28 are provided each with a depending post or lug 34, as shown, for a purpose hereinafter to be described. The upper frame members 10 and the lower frames 28 may be conveniently constructed of spring metal or the like and are adapted when released from their assembled state to spring apart sufficiently to facilitate removal and insertion of replacement lenses.

The upper frames 10 are adapted to receive upper lenses 11 which may be of any type suitable to the needs of the user for normal or long distance vision and which preferably are of a sectional shape corresponding approximately to the upper two-thirds of the elliptical or circular area of the entire frame and lens portion of the eyeglasses. Lenses of this size and configuration, as best illustrated in Fig. 4, are ample for purposes of horizontal or normal vision when disposed perpendicularly to the line thereof, as shown, and allow for the use of other complementary lower lens sections, usually of greater magnification, for downward vision such as when the user is reading. Such lower lenses 29 are supported in the lower frames 28 and, as shown, are of a sectional shape corresponding approximately to the lower one-third of the elliptical or circular area of the entire frame and lens portion of the eyeglasses and are ample in size and configuration for the more limited field of downward vision when disposed perpendicularly to the line thereof, as illustrated in Fig. 4.

For connecting the upper and lower frame sections, 10 and 28 respectively, arms 36 are provided one for each complementary pair of frames. Each arm 36 carries at its lower end a collar 38 or other suitable means for engaging the above mentioned post 34 carried by each of the lower frame members 28 and is preferably soldered or otherwise permanently secured thereto. The upper end of each arm 36 is provided with a clip member indicated in its entirety at 40 which, as best shown in Fig. 5, may comprise a collar portion 42 in which the upper end of the arm 36 is firmly secured and an integral channel shaped portion 44 having a depending flange 46. As shown in Fig. 1, the clips 40 are adapted to snap over the lips 18 and 26 of the upper frame sections 10 and the temple member posts supported therein.

Connecting arms 36, in the form of the invention illustrated, are so constructed that they may be manually bent or shaped into the curvature necessary for the angular lens adjustment desired but at the same time the arms possess sufficient rigidity that such shape will be retained under normal conditions of use so as to maintain the lens frames in their selected relative positions. A material suitable for this purpose is relatively heavy wire 48 which may be encased in a rubber sheathing 50 such as shown in Fig. 5.

Use of the eyeglasses as herein described and illustrated will be readily apparent. To insert the lenses suited for purposes of normal and close vision of the user, the clips 40 of the connecting arms 36 are disengaged from the lateral projections 18 and 26 of the upper frame members 10 whereby to permit the arcuate sections 14 and 22 of the upper frame members which are connected by the temple posts and the lower frame members 28 to spring slightly apart. The two thirds lenses 11 are then positioned in the channelled portion of the sections 14 and 22 of the upper frame members and the one-third lenses 29 positioned in the channelled portion of the lower frame members 28 whereupon the clip 40 of the connecting arm 36 is positioned as shown in Fig. 1 to secure the frame members and lenses in assembled operative relationship.

In use, the upper lenses 11 ordinarily are supported in a plane perpendicular to the horizontal or normal line of vision, as illustrated in Fig. 4. By appropriately bending connecting arms 36, the lower frame members 28 carried thereby may be caused to assume any desired angular position relative to the upper frame members. Usually, the lower frame members will be positioned, as further illustrated in Fig. 4, to support the lower lenses 29 in a plane perpendicular to the line of downward vision ordinarily employed when the user is reading and lenses of this particular character are required. In addition to adjusting the lenses 29 on their horizontal axes, the connecting arms 36 are adapted to be slightly twisted to adjust the lenses 29 on their vertical axes where this is desired such as for cross-eyed users. Various other specific uses and adaptations of the eyeglasses of the present invention will be readily apparent to meet particular needs of users.

It is understood that the present invention is not limited to the precise construction and arrangement of parts herein shown and described but embraces all modifications thereof within the scope of the following claims.

Having described my invention, what I claim is:

1. Eyeglasses comprising a pair of normally subtantially planar lenses, separate upper and lower sections forming said lenses, separate frames for said upper and lower sections, and connecting means secured to adjacent upper and lower frames for supporting said lower sections for angular movement relative to said upper sections.

2. The eyeglasses of claim 1 wherein the connecting means is secured between a lateral portion of the upper frame and the lower medial portion of the lower frame.

JOHN L. ROONEY.

REFERENCES CITED

The following references are of record in the file of this patent:

UNITED STATES PATENTS

| Number | Name | Date |
| --- | --- | --- |
| 170,795 | Yeiser | Dec. 7, 1875 |
| 956,690 | Donaldson | May 3, 1910 |
| 1,074,145 | Walts | Sept. 30, 1913 |
| 1,429,854 | Elmore | Sept. 19, 1922 |
| 1,909,285 | Landers | May 16, 1933 |
| 1,988,646 | Dirr | Jan. 22, 1935 |

FOREIGN PATENTS

| Number | Country | Date |
| --- | --- | --- |
| 324,532 | Great Britain | Jan. 30, 1930 |
| 846,221 | France | June 5, 1939 |